United States Patent
Evans et al.

(10) Patent No.: US 9,896,570 B2
(45) Date of Patent: Feb. 20, 2018

(54) INDANE AND/OR TETRALIN ESTER PLASTICIZERS, AND BLENDS THEREFROM

(71) Applicant: ExxonMobil Chemical Patents Inc.

(72) Inventors: Meagan E. Evans, Houston, TX (US); Christopher M. Evans, Houston, TX (US); Christine A. Costello, Easton, PA (US); Stephen Zushma, Clinton, NJ (US); Madhavi Vadlamudi, Clinton, NJ (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 159 days.

(21) Appl. No.: 14/973,450

(22) Filed: Dec. 17, 2015

(65) Prior Publication Data

US 2016/0280884 A1 Sep. 29, 2016

Related U.S. Application Data

(60) Provisional application No. 62/138,179, filed on Mar. 25, 2015.

(51) Int. Cl.
| | | |
|---|---|---|
| *C08K 5/12* | (2006.01) | |
| *C08K 5/101* | (2006.01) | |
| *H01B 3/44* | (2006.01) | |

(52) U.S. Cl.
CPC ............ *C08K 5/101* (2013.01); *C08K 5/12* (2013.01); *H01B 3/443* (2013.01)

(58) Field of Classification Search
CPC .......... C08K 5/101; C08K 5/12; H01B 3/443
See application file for complete search history.

(56) References Cited

U.S. PATENT DOCUMENTS

| | | | |
|---|---|---|---|
| 2,520,084 A | 8/1950 | Daxxi | |
| 2,629,751 A | 2/1953 | Wiggins | |
| 2,780,609 A | 2/1957 | Petropoulos | |
| 3,763,222 A | 10/1973 | Aronoff et al. | |
| 3,839,261 A | 10/1974 | Aronoff et al. | |
| 5,138,022 A | 8/1992 | Mang et al. | |
| 5,370,809 A | 12/1994 | Ishida et al. | |
| 6,239,298 B1 | 5/2001 | Williamson et al. | |
| 6,740,254 B2 | 5/2004 | Zhou et al. | |
| 6,777,514 B2 | 8/2004 | Patil et al. | |
| 7,297,738 B2 | 11/2007 | Gosse et al. | |
| 8,476,350 B2 | 7/2013 | Dakka et al. | |
| 2006/0004151 A1 | 1/2006 | Shaikh et al. | |
| 2006/0167151 A1* | 7/2006 | Grass | C07C 67/303 524/285 |
| 2006/0183832 A1 | 8/2006 | Tsuchihashi et al. | |
| 2006/0247461 A1 | 11/2006 | Schlosberg et al. | |
| 2008/0242895 A1 | 10/2008 | Godwin et al. | |
| 2011/0021680 A1 | 1/2011 | Colle et al. | |
| 2012/0108874 A1 | 5/2012 | Gralla et al. | |
| 2014/0228494 A1 | 8/2014 | Colle et al. | |

FOREIGN PATENT DOCUMENTS

| | | |
|---|---|---|
| JP | 51-070396 | 12/1974 |
| JP | 52-121596 | 3/1976 |
| JP | 60-181142 | 2/1984 |
| WO | 1999/032427 | 7/1999 |
| WO | 2003/029339 | 4/2003 |
| WO | 2004/046078 | 6/2004 |

OTHER PUBLICATIONS

Clary et al., "A Green, One-Pot Route to the Biphenyldicarboxylic Acids: Useful Intermediates in Polymer Synthesis," International Journal of Organic Chemistry, Jun. 2013, vol. 3(2), pp. 143-147.
Godwin et al., "Plasticizers," Applied Polymer Science: 21st Century, Elsevier, 2000, pp. 157-175.
Kulev et al., "Esters of diphenic acid and their plasticizing properties," Izvestiya Tomskogo Politekhnicheskogo Instituta, 1961, vol. 111 (Abstract).
Shioda et al., "Synthesis of dialkyl diphenates and their properties," Yuki Gosei Kagaku Kyokaishi 1959, 17. (Abstract).

* cited by examiner

*Primary Examiner* — Edward J Cain

(57) ABSTRACT

Plasticizers of indane and or tetralin esters and blends thereof with thermoplastic polymers, such as PVC, are disclosed.

18 Claims, 1 Drawing Sheet

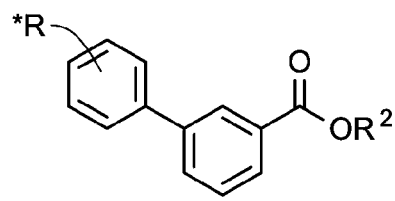
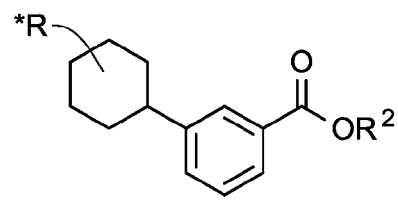
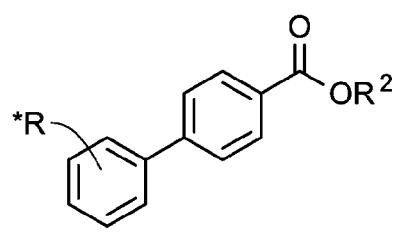
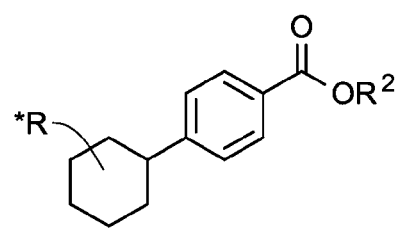
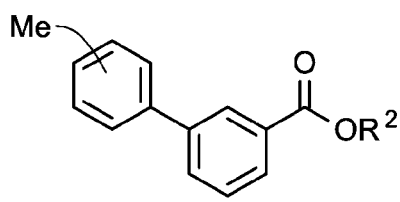
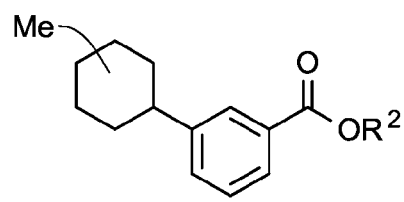
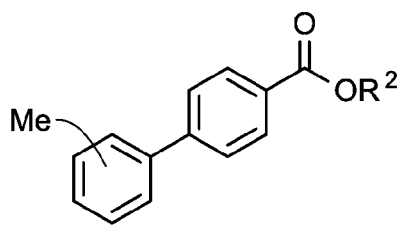
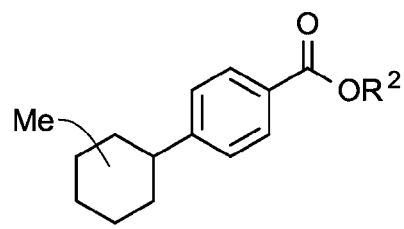

INDANE AND/OR TETRALIN ESTER PLASTICIZERS, AND BLENDS THEREFROM

PRIORITY

This invention claims priority to and the benefit of U.S. Ser. No. 62/138,179, filed Mar. 25, 2015.

FIELD OF THE INVENTION

This disclosure relates plasticizers of indane and tetralin esters and blends thereof with thermoplastic polymers.

BACKGROUND OF THE INVENTION

Plasticizers are incorporated into a resin (usually a plastic or elastomer) to increase the flexibility, workability, or distensibility of the resin. The largest use of plasticizers is in the production of "plasticized" or flexible polyvinyl chloride (PVC) products. Typical uses of plasticized PVC include films, sheets, tubing, coated fabrics, wire and cable insulation and jacketing, toys, flooring materials such as vinyl sheet flooring or vinyl floor tiles, adhesives, sealants, inks, and medical products such as blood bags and tubing, and the like.

Other polymer systems that use small amounts of plasticizers include polyvinyl butyral, acrylic polymers, nylon, polyolefins, polyurethanes, and fluoroplastics. Plasticizers can also be used with rubber (although often these materials fall under the definition of extenders for rubber rather than plasticizers). A listing of the major plasticizers and their compatibilities with different polymer systems is provided in "Plasticizers," A. D. Godwin, in Applied Polymer Science 21st Century, edited by C. D. Craver and C. E. Carraher, Elsevier (2000); pp. 157-175.

In the late 1990's and early 2000's, various compositions based on cyclohexanoate, cyclohexanedioates, and cyclohexanepolyoate esters were said to be useful for a range of goods from semi-rigid to highly flexible materials. See, for instance, WO 99/32427, WO 2004/046078, WO 2003/029339, US 2006/0247461, and U.S. Pat. No. 7,297,738.

Other references of interest include: U.S. Pat. No. 6,239,298; U.S. Pat. No. 6,740,254; US 2011/0021680; US 2014/0228494; U.S. Pat. No. 6,777,514; US 2008/0242895; U.S. Pat. No. 8,476,350; U.S. Pat. No. 2,520,084; JP 51-070396; JP 52-121596; JP 60-181142; U.S. Pat. No. 5,370,809; US 2012/0108874; U.S. Pat. No. 5,138,022; "Esters of diphenic acid and their plasticizing properties", Kulev et al., *Izvestiya Tomskogo Politekhnicheskogo Instituta* (1961) 111; "Synthesis of dialkyl diphenates and their properties", Shioda et al., *Yuki Gosei Kagaku Kyokaishi* (1959), 17; Clary, International Journal of Organic Chemistry, 2013, Vol. 3, pp. 143-147; US 2006/0183832; U.S. Pat. No. 2,780,609; U.S. Pat. No. 3,763,222; U.S. Pat. No. 2,629,751; and US 2006/0004151.

There is increased interest in developing new plasticizers that offer good plasticizer performance characteristics (such as melting or chemical and thermal stability, pour point, glass transition, increased compatibility, good performance and low temperature properties) and are competitive economically. The present disclosure is directed towards plasticizers, that can be made from low cost feeds and employ fewer manufacturing steps in order to meet economic and performance targets.

Further, the present disclosure is directed towards plasticizers, that have good compatibility with thermoplastic polymers, such as PVC, good clarity and good low temperature properties.

SUMMARY OF THE INVENTION

This invention relates to a composition comprising a thermoplastic polymer and a plasticizer of the formula:

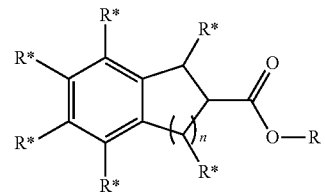

where n is 1 or 2, R is C1 to C20 linear, cyclic or branched alkyl, and each R* is, independently, H or C1 to C20 linear, cyclic or branched alkyl, where any adjacent R* can form ring structures.

This invention relates to a composition comprising a thermoplastic polymer and a plasticizer of the formula:

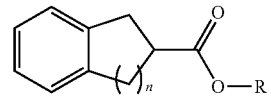

wherein n is 1 or 2, and R is $C_1$ to $C_{20}$ linear, cyclic or branched alkyl.

This invention also relates to a composition comprising:
1) a thermoplastic polymer,
2) at least one indane or tetralin ester, preferably represented by the formula:

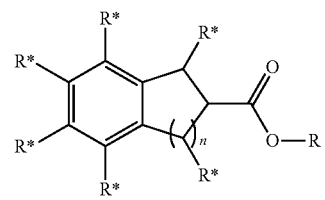

where n is 1 or 2, R is C1 to C20 linear, cyclic or branched alkyl, and each R* is, independently, H or C1 to C20 linear, cyclic or branched alkyl, where any adjacent R* can form ring structures; and
3) optionally, one or more second plasticizers comprising one or more of alkyl terephthalate, alkyl phthalate, alkyl benzoate ester, di-benzoate ester, ester of cyclohexane polycarboxylic acid, dialkyl adipate, or compound(s) represented by the formula:

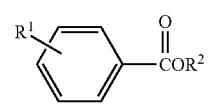

wherein $R^1$ is a saturated or unsaturated cyclic hydrocarbon optionally substituted with an alkyl and/or an OXO-ester, and $R^2$ is a $C_4$ to $C_{14}$ hydrocarbyl, or mixtures thereof.

This invention also relates to a composition comprising:

1) a thermoplastic polymer,
2) at least one indane or tetralin ester, preferably represented by the formula:

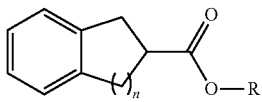

wherein n is 1 or 2, R is $C_1$ to $C_{20}$ linear, cyclic or branched alkyl; and 3) optionally, one or more second plasticizers comprising one or more of alkyl terephthalate, alkyl phthalate, alkyl benzoate ester, di-benzoate ester, ester of cyclohexane polycarboxylic acid, dialkyl adipate, or compound(s) represented by the formula:

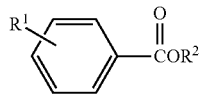

wherein $R^1$ is a saturated or unsaturated cyclic hydrocarbon optionally substituted with an alkyl and/or an OXO-ester, and $R^2$ is a $C_4$ to $C_{14}$ hydrocarbyl, or mixtures thereof.

BRIEF DESCRIPTION OF THE FIGURES

FIG. 1 shows useful indane and/or tetralin esters, where *R is one or more of H, or a C1 to C14 alkyl (such as H and/or Me) and $R^2$ is C1 to C20 linear, cyclic or branched alkyl.

DETAILED DESCRIPTION OF THE INVENTION

All numerical values within the detailed description and the claims herein are modified by "about" or "approximately" the indicated value, and take into account experimental error and variations that would be expected by a person of ordinary skill in the art.

This invention relates to a composition comprising:
1) a thermoplastic polymer (such as polyvinyl chloride), and
2) at least one indane or tetralin ester, preferably represented by the formula:

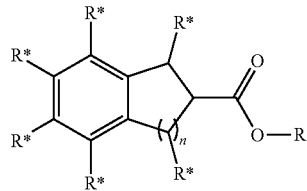

where n is 1 or 2, R is C1 to C20 linear, cyclic or branched alkyl, and each R* is, independently, H or C1 to C20 linear, cyclic or branched alkyl, where any adjacent R* can form ring structures (preferably represented by the formula:

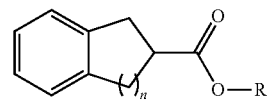

wherein n is 1 or 2, and R is a $C_1$ to $C_{20}$ linear, cyclic or branched alkyl); and 3) optionally, one or more second plasticizers selected from the group consisting of alkyl terephthalates, alkyl phthalates, alkyl benzoate esters, di-benzoate esters, esters of cyclohexane polycarboxylic acids, dialkyl adipates, or compound(s) represented by the formula:

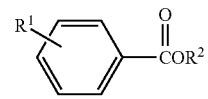

wherein $R^1$ is a saturated or unsaturated cyclic hydrocarbon (preferably a saturated or unsaturated C6 cyclic hydrocarbon) optionally substituted with an alkyl and/or an OXO-ester (preferably a C1 to C14 alkyl or OXO-ester), and $R^2$ is a $C_4$ to $C_{14}$ hydrocarbyl.

Indane and Tetralin Ester Plasticizers

Indane and tetralin compounds useful herein include compounds represented by the formula:

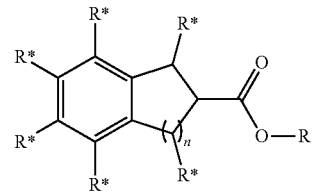

where n is 1 or 2, R is C1 to C20 linear, cyclic or branched alkyl, and each R* is, independently, H or C1 to C20 alkyl, (preferably methyl, ethyl, propyl, butyl, pentyl, hexyl, heptyl, octyl, nonyl, decyl, undecyl, docecyl, 3,5,5-trimethyl hexene-1, and or 2-methylpentene-1) where any adjacent R* can form ring structures.

Useful indane and tetralin esters include compounds represented by the formula:

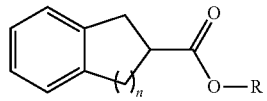

wherein n is 1 or 2, and R is $C_1$ to $C_{20}$ linear, cyclic or branched alkyl, preferably a $C_1$ to $C_{14}$ alkyl, preferably a $C_1$ to $C_{12}$ alkyl, preferably methyl, ethyl, propyl, butyl, pentyl, hexyl, heptyl, octyl, nonyl, decyl, undecyl, docecyl, 3,5,5-trimethyl hexene-1, 2-methylpentene-1, an isomer thereof or a mixture thereof.

The plasticizers described herein can be synthesized by means known in the art, such as by hydroformylation, oxidation and esterification of an indane, i.e.,

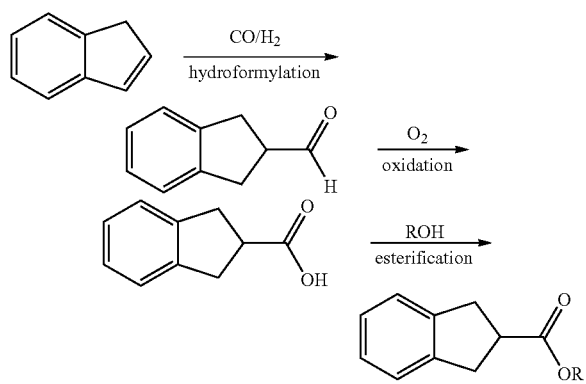

It should be noted that commercial sources of indene, potentially from crude cracking, will also likely contain methylated indenes. The above synthesis should be also viable for methyl indene and therefore the final indane ester plasticizer may contain mixtures of methyl derivations. Additionally, this process could also utilize indane derivatives as a stating material; though, it would typically include a dehydrogenation step prior to the aforementioned chemistries.

Likewise, tetralin esters can be made by oxidation, esterification then hydrogenation of one or both phenyl rings to make the tetralin or decalin derivatives, i.e.,

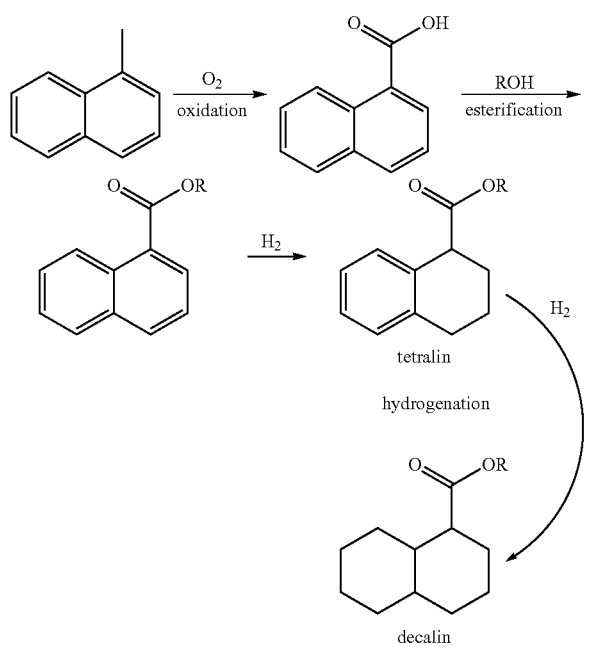

A useful route to tetralin ester compounds is by starting with methyl naphthalene. Isomers of methyl naphthalene are commercially available (some are obtained as byproducts of crude cracking). Starting from this source, the target molecules is produced by the conversion of methyl groups to carboxylic acids via oxidization followed by esterification with any available alcohol. Next, the ester compound is partially hydrogenated to the tetralin derivative or fully hydrogenated to the decalin compound. Catalytic hydrogenation of the aromatic ring occurs without reduction of the ester functionality. Further, the production of tetralin esters with multiple derivations can be accomplished by using starting material that contains di- and tri-methylated isomers of naphthalene and upon treatment with the instant process will yield multiple ester functionalities per naphthalene unit.

Particularly useful compounds include:
1H-Indene-2-carboxylic acid, 2,3-dihydro-isononyl ester;
1H-Indene-2-carboxylic acid, 2,3-dihydro-2-methyl-isononyl ester;
1H-Indene-1-carboxylic acid, 2,3-dihydro-1-methyl-isononyl ester;
1H-Indene-1-carboxylic acid, 2,3-dihydro-isononyl ester;
1-Naphthalenecarboxylic acid, 1,2,3,4-tetrahydro-1-methyl-isononyl ester;
1-Naphthalenecarboxylic acid, 1,2,3,4-tetrahydro-isononyl ester;
2-Naphthalenecarboxylic acid, 1,2,3,4-tetrahydro-2-methyl-isononyl ester;
2-Naphthalenecarboxylic acid, 1,2,3,4-tetrahydro-isononyl ester;
1-H-Indene-2-carboxylic acid, 2,3-dihydro, n-pentyl ester;
1-H-Indene-2-carboxylic acid, 2,3-dihydro, n-decyl ester; an isomer thereof, and mixtures thereof.

Additional useful compounds include those represented by one or more of the formulae:

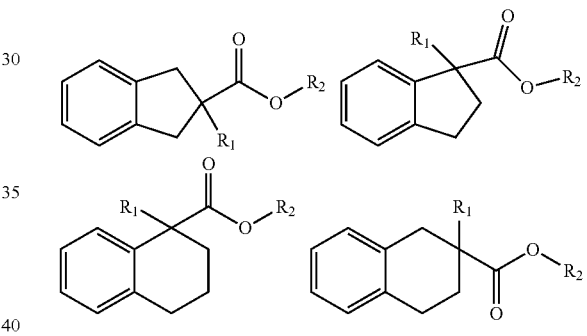

where $R_1$ is H, or an alkyl group (such as a C1 to C12 alkyl, preferably H or methyl) and $R_2$ is a $C_1$ to $C_{20}$ linear, cyclic or branched alkyl, preferably a $C_1$ to $C_{14}$ alkyl, preferably a $C_1$ to $C_{12}$ alkyl, preferably methyl, ethyl, propyl, butyl, pentyl, hexyl, heptyl, octyl, nonyl, decyl, undecyl, docecyl, 3,5,5-trimethyl hexene-1, 2-methylpentene-1, an isomer thereof, or a mixture thereof; preferably isononyl.

In a preferred embodiment of the invention, plasticizer compound useful herein may be a mixture of two, three, four or more esters described herein above at any ratio. In an embodiment of the invention, the first ester is present at 0.1 to 99.8 wt % (preferably 1 to 98 wt %, preferably 5 to 94.9 wt %, preferably 10 to 89.9 wt %), the second ester is present at 0.1 to 99.8 wt % (preferably 1 to 98 wt %, preferably 5 to 94.9 wt %, preferably 10 to 89.9 wt %), and each additional ester is present at least 0.1 wt %, preferably at least 1 wt %, preferably at least 5 wt %, preferably at least 10 wt %, based upon the weight of the ester compounds.

Second Plasticizer

In a useful embodiment of the invention, a second plasticizer may also be present in the blend in addition to the indane or tetralin ester(s).

Particularly useful second plasticizers include alkyl terephthalate, alkyl phthalate, alkyl benzoate ester, di-benzoate ester, ester of cyclohexane polycarboxylic acid, dialkyl adipate, or mixtures thereof, preferably the second plasticizers is selected from the group consisting of alkyl terephthalates, alkyl phthalates, alkyl benzoate esters, dibenzoate esters, esters of cyclohexane polycarboxylic acids, dialkyl adipates, and compounds of the formula:

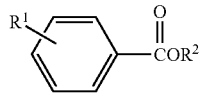

wherein $R^1$ is a saturated or unsaturated cyclic hydrocarbon optionally substituted with an alkyl and/or an OXO-ester, and $R^2$ is a $C_4$ to $C_{14}$ hydrocarbyl or the hydrocarbon residue of a $C_4$ to $C_{14}$ OXO-alcohol, and mixtures thereof (such as one, two, three, four, five or more) second plasticizers.

Useful second plasticizers include compounds of the formula:

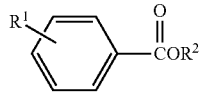

wherein $R^1$ is a saturated or unsaturated cyclic hydrocarbon optionally substituted with an alkyl and/or an OXO-ester, and $R^2$ is a $C_4$ to $C_{14}$ hydrocarbyl, preferably the second plasticizer is an alkylated biphenyl ester, such as a dimethylbiphenyl ester or an alkylated biphenyl ester derivative.

Useful second plasticizers may also comprise a mixture comprising at least two compounds of the formula:

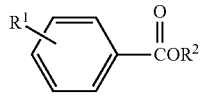

wherein in the first compound, $R^1$ is a saturated cyclic hydrocarbon optionally substituted with an alkyl and/or an OXO-ester, and $R^2$ is a $C_4$ to $C_{14}$ hydrocarbyl, preferably a hydrocarbon residue of a $C_4$ to $C_{14}$ OXO-alcohol; and in the second compound $R^1$ is an unsaturated cyclic hydrocarbon optionally substituted with an alkyl and/or an OXO-ester, and $R^2$ is a $C_4$ to $C_{14}$ hydrocarbyl, preferably a hydrocarbon residue of a $C_4$ to $C_{14}$ XXO-alcohol. Particularly preferred second plasticizers are those represented in FIG. 1, where *R is one or more of H, or a C1 to C14 alkyl, preferably methyl, ethyl, propyl, butyl, pentyl, hexyl, heptyl, octyl, nonyl, decyl, undecyl, docecyl, 3,5,5-trimethyl hexene-1, and/or 2-methylpentene-1, preferably H and/or Me.

Particularly preferred second plasticizers include those represented by the formula:

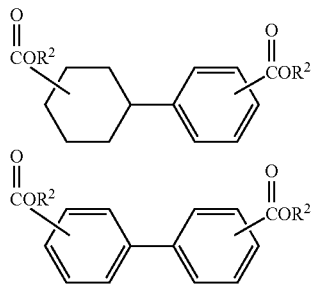

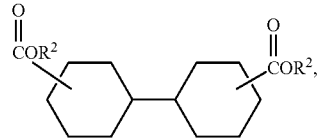

where each $R_2$ is, independently, a $C_4$ to $C_{14}$ hydrocarbyl, preferably the residue of a $C_4$ to $C_{14}$ OXO-alcohol, preferably each $R_2$ is, independently, a $C_6$ to $C_9$ hydrocarbyl, preferably a $C_6$, $C_7$, $C_8$ or $C_9$ hydrocarbyl, preferably a $C_6$, $C_7$, $C_8$ or $C_9$ alkyl, such as hexyl, heptyl, octyl or nonyl, or an isomer thereof (note the use of a subscript for $R_2$ is not meant to indicate 2R groups).

Useful second plasticizers may be represented by the formula:

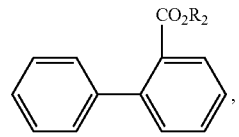

wherein $R_2$=a $C_5$ to $C_{14}$ hydrocarbyl, preferably $R_2$ is $C_9H_{19}$, $C_{10}H_{21}$ or $C_{13}H_{27}$, (note the use of a subscript for $R_2$ is not meant to indicate 2R groups).

Useful second plasticizers may be represented by the formula:

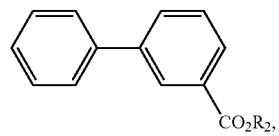

wherein $R_2$=a $C_5$ to $C_{14}$ hydrocarbyl, preferably $R_2$ is $C_9H_{19}$, $C_{10}H_{21}$, or $C_{13}H_{27}$ (note the use of a subscript for $R_2$ is not meant to indicate 2R groups).

Useful second plasticizers may be represented by the formula:

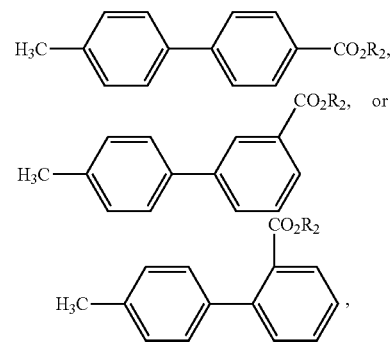

wherein $R_2$=a $C_5$ to $C_{14}$ hydrocarbyl, preferably $R_2$=$C_9H_{19}$, $C_{10}H_{21}$, or $C_{13}H_{27}$ (note the use of a subscript for $R_2$ is not meant to indicate 2R groups).

Useful second plasticizers may be represented by the formula (or comprise a mixture of compounds represented by the formulas):

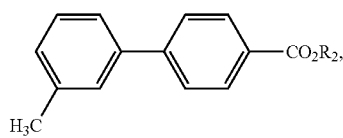

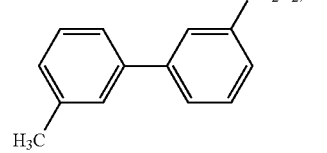

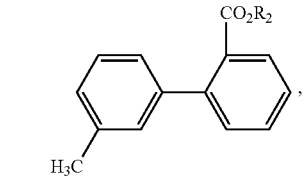

wherein $R_2$=a $C_5$ to $C_{14}$ hydrocarbyl, preferably $R_2$=$C_9H_{19}$, $C_{10}H_{21}$, or $C_{13}H_{27}$ (note the use of a subscript for $R_2$ is not meant to indicate 2R groups).

Useful second plasticizers may be represented by the formula (or comprise a mixture of compounds represented by the formulas):

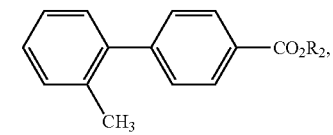

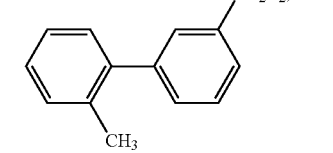

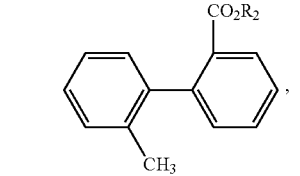

wherein $R_2$=a $C_5$ to $C_{14}$ hydrocarbyl, preferably $R_2$=$C_9H_{19}$, $C_{10}H_{21}$, or $C_{13}H_{27}$ (note the use of a subscript for $R_2$ is not meant to indicate 2R groups).

Useful second plasticizers may be represented by the formula (or comprise a mixture of compounds represented by the formulas):

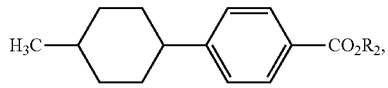

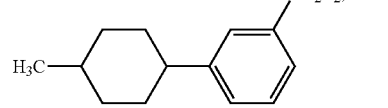

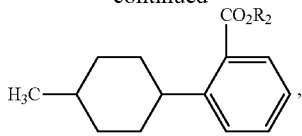

wherein $R_2$=a $C_5$ to $C_{14}$ hydrocarbyl, preferably $R_2$=$C_9H_{19}$, $C_{10}H_{21}$, or $C_{13}H_{27}$ (note the use of a subscript for $R_2$ is not meant to indicate 2R groups).

Useful second plasticizers may be represented by the formula (or comprise a mixture of compounds represented by the formulas):

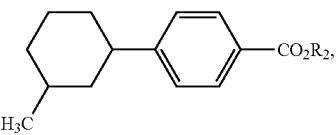

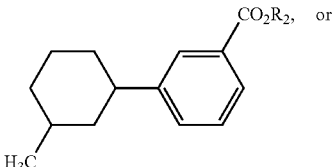

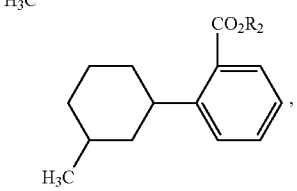

wherein $R_2$=a $C_5$ to $C_{14}$ hydrocarbyl, preferably $R_2$=$C_9H_{19}$, $C_{10}H_{21}$, or $C_{13}H_{27}$ (note the use of a subscript for $R_2$ is not meant to indicate 2R groups).

Useful second plasticizers may be represented by the formula (or comprise a mixture of compounds represented by the formulas):

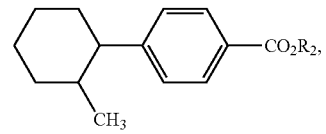

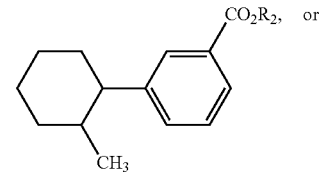

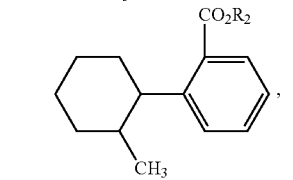

wherein $R_2$=a $C_5$ to $C_{14}$ hydrocarbyl, preferably $R_2$=$C_9H_{19}$, $C_{10}H_{21}$, or $C_{13}H_{27}$ (note the use of a subscript for $R_2$ is not meant to indicate 2R groups).

Particularly useful second plasticizers include those represented by the formula:

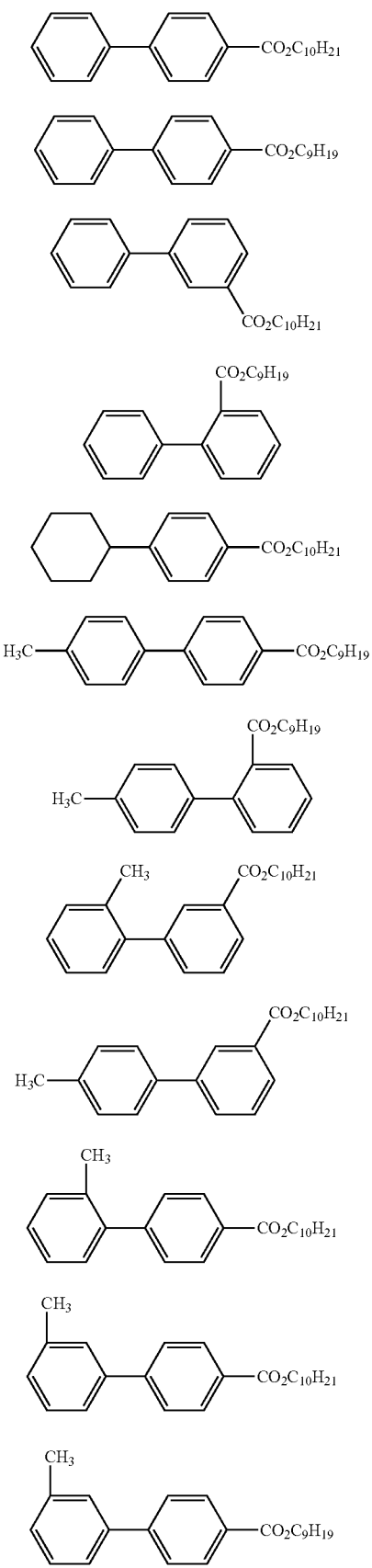
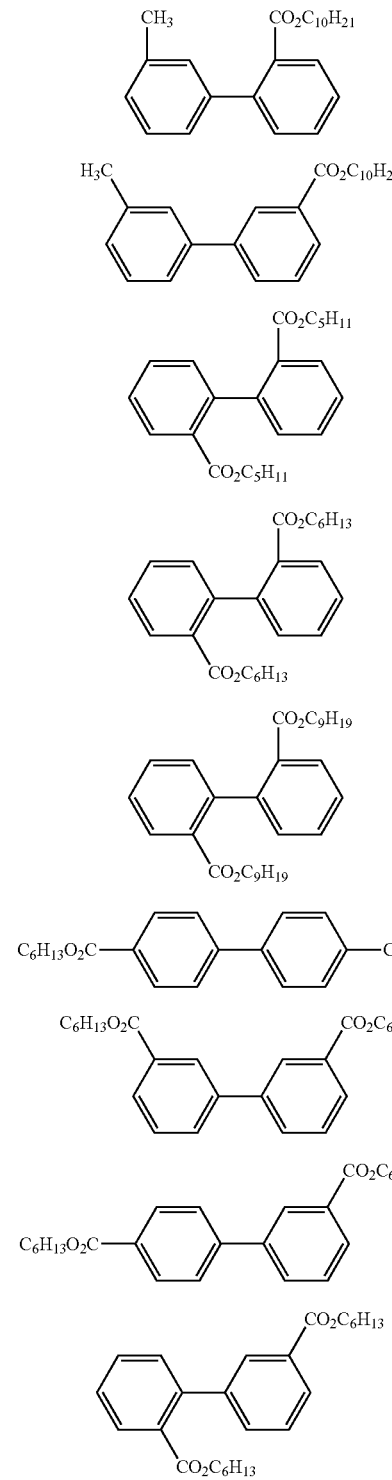
Additionally, compositions described by the formulas depicted herein may be partially or fully hydrogenated.
These compounds can be produced according to the methods described in U.S. Pat. No. 8,829,093; U.S. Pat. No. 9,085,669, US 2014/0316155; US 2014/0275606; US 2014/0275609; US 2014/0275605; and US 2014/0275607.
Useful second plasticizers also include alkyl terephthalates (preferably C4 to C12 alkyl terephthalates) such as di-n-butyl terephthalate, diisobutyl terephthalate, di-n-octyl terephthalate, diisooctyl terephthalate, di-2-ethylhexyl terephthalate, di-n-nonyl terephthalate, diisononyl terephthalate, di-n-decyl terephthalate, di-2-propyl heptyl terephthalate, and diisodecyl terephthalate.

Useful second plasticizers also include the alkyl phthalates (preferably C4 to C40 alkyl, preferably C4 to C14 alkyl) and alkyl isophthalates (preferably C4 to C40 alkyl, preferably C4 to C14 alkyl) such as di-n-nonyl phthalate, diisononyl phthalate, di-n-decyl phthalate, diisodecyl phthalate, di-2-propyl heptyl phthalate, di-n-undecyl phthalate, ditridecyl phthalate, diisotridecyl phthalate, di-n-propyl isophthalate, di-n-nonyl isophthalate, diisononyl isophthalate, di-n-decyl isophthalate, diisodecyl isophthalate, di-2-propyl heptyl isophthalate, di-n-undecyl isophthalate, and diisotridecyl isophthalate.

Useful second plasticizers also include alkyl benzoate esters having from 7 to 13 carbon atoms in the alkyl moiety, preferably $C_9$ to $C_{13}$, preferably isononyl benzoate, nonyl benzoate, isodecyl benzoate, decyl benzoate, 2-propylheptyl benzoate, isoundecyl benzoate, and isotridecyl benzoate.

Useful second plasticizers also include esters of cyclohexane polycarboxylic acids (including alkyl 1,2-cyclohexanedicarboxylates, alkyl 1,3-cyclohexanedicarboxylates and alkyl 1,4-cyclohexanedicarboxylates) preferably having 4 to 13 carbons in the side chain, preferably 7 to 10 carbons in the side chain, preferably di-heptyl cylohexanoate, di-2-ethylhexyl cylochexanoate, di-n-nonyl cylochexanoate, diisononyl cylochexanoate, di-n-decyl cylochexanoate, diisodecyl cylochexanoate, and di-2-propyl heptyl cylochexanoate.

Useful second plasticizers also include dialkyl adipates having 4 to 13 carbon atoms preferably having 7 to 10 carbons in the alkyl moiety, preferably diheptyl adipate, dioctyl adipate, diisononyl adipate, diisodecyl adipate, and di 2-propylheptyl adipate.

Useful second plasticizers also include dibenzoate esters (also referred to as dibenzoic esters of glycols), preferably dipropylene glycol dibenzoate, diethyleneglycol dibenzoate, triethylene glycol dibenzoate and mixtures of dipropylene, diethylene and triethylene glycol dibenzoates.

Examples of commercially available benzenepolycarboxylic acid esters useful herein include phthalates such as: Palatinol™ AH (Di-(2-ethylhexyl) phthalate; Palatinol™ N (Diisononyl phthalate); Vestinol™ 9 (Diisonyl phthalate); Palatinol™ Z (Diisodecyl phthalate); Palatinol™ 10-P (Di-(2-Propylheptyl) phthalate); Palatinol™ 711P (Heptylundecyl phthalate); Palatinol™ 911 (Nonylundecyl phthalate); Palatinol™ 11P-E (Diundecyl phthalate); Palatinol™ 11P-E; Jayflex™ DINP; Jayflex™ DIDP; Jayflex™ DIUP; Jayflex™ DTDP; and Emoltene™ 100.

Examples of cyclohexane polycarboxylic acid esters useful herein include: Hexamoll DINCH™ (diisonyl cyclohexanoate); Elatur™ CH (diisonyl cyclohexanoate); Nan Ya™ DPEH (bis(2-ethyl hexyl) cyclohexanoate); and Nan Ya™ DPIN (diisononyl cyclohexanoate).

Examples of commercially available adipates useful herein include: Plastomoll™ DOA (diisononyl adipate); Oxsoft™ DOA; Eastman™ DOA (di-(2-ethylhexyl) adipates); and Plastomoll™ DNA (diisononyl adipate).

Examples of commercially available alkyl benzoates useful herein include: Vestinol™ INB (isononyl benzoate); Jayflex™ MB10 (isodecyl benzoate); Benzoflex™ 131 (isodecyl benzoate); and Uniplex™ 131 (isodecyl benzoate).

Particularly useful examples of useful plasticizers include the commercially available terephtalates such as Eastman 168™; OXSOFT GPO™; and LGFLEX GL™ 300 (bis(2-ethylhexyl) terephthalate).

Particularly useful examples of useful plasticizers include the commercially available di-benzoate plasticizer mixtures such as: Benzoflex™ 988; Benzoflex™ 2088; Kflex™ 500; and Santicizer™ 9000 series.

Particularly useful second plasticizers include: dialkyl (ortho)phthalate, preferably having 4 to 13 carbon atoms in the alkyl chain; trialkyl trimellitates, preferably having 4 to 10 carbon atoms in the side chain; dialkyl adipates, having 4 to 13 carbon atoms; dialkyl terephthalates each preferably having 4 to 8 carbon atoms and more particularly 4 to 7 carbon atoms in the side chain; alkyl 1,2-cyclohexanedicarboxylates, alkyl 1,3-cyclohexanedicarboxylates and alkyl 1,4-cyclohexanedicarboxylates, and preferably here alkyl 1,2-cyclohexanedicarboxylates each preferably having 4 to 13 carbon atoms in the side chain; dibenzoic esters of glycols; and alkyl benzoates, preferably having 7 to 13 carbon atoms in the alkyl chain.

Particularly useful second plasticizers include: dialkyl sebacates preferably having 4 to 13 carbon atoms; dialkyl azelates preferably having 4 to 13 carbon atoms; alkylsulfonic esters of phenol with preferably one alkyl radical containing 8 to 22 carbon atoms; polymeric plasticizers (based on polyester in particular), glyceryl esters, acetylated glycerol esters, epoxy estolide fatty acid alkyl esters, citric triesters such as tributylacetyl citrate having a free or carboxylated OH group and for example alkyl radicals of 4 to 9 carbon atoms; tri-2-ethylhexyl phosphate, trioctyl phosphate such as 2-ethylhexyl-isodecyl phosphate, di-2-ethylhexyl phenyl phosphate, triphenyl phosphate, tricresyl phosphate; high chlorine content chlorinated paraffins, alkylpyrrolidone derivatives having alkyl radicals of 4 to 18 carbon atoms and also polyester plasticizers, such as pentaerythritol ester of C5 (valeric) to C9 (pelargonic) acids. In all instances, the alkyl radicals can be linear or branched and the same or different.

Thermoplastic Polymers

Preferably, the thermoplastic polymer is selected from the group consisting of vinyl chloride resins, polyesters, polyurethanes, ethylene-vinyl acetate copolymer, rubbers, poly (meth)acrylics and combinations thereof, alternately the polymer is selected from the group consisting of polyvinyl chloride (PVC), polyvinylidene chloride, a copolymer of polyvinyl chloride and polyvinylidene chloride, and polyalkyl methacrylate (PAMA), preferably, the polymer is a copolymer of vinyl chloride with at least one monomer selected from the group consisting of vinylidene chloride, vinyl acetate, vinyl propionate, vinyl butyrate, vinyl benzoate, methyl acrylate, ethyl acrylate, and butyl acrylate.

In any embodiment of the invention, in the polymer composition comprising a thermoplastic polymer and indane and/or tetralin ester plasticizer, the total amount of the indane and tetralin ester plasticizer(s) is from 5 to 90 wt %, based upon the weight of the polymer and plasticizer(s), preferably from 10 to 85 wt %, even more preferably in the range from 15 to 80 wt %, preferably in the range from 20 to 75 wt %.

In any embodiment of the invention, in the polymer composition comprising a thermoplastic polymer and at least two plasticizers (at least one first plasticizer of indane and/or tetralin ester and at least one second plasticizer), the total amount of all plasticizers is from 5 to 90 wt %, based upon the weight of the polymer and plasticizer, preferably from 10 to 85 wt %, even more preferably in the range from 15 to 80 wt %, preferably in the range from 20 to 75 wt %.

In any embodiment, the mixture of first and second plasticizers comprises from 1 to 99 wt % (preferably from 5 to 90 wt %, preferably 10 to 80 wt %) of at least one first plasticizer of indane and/or tetralin ester(s) and from 99 to 1 wt % (preferably from 95 to 10 wt %, preferably 90 to 20 wt %) of at least one second plasticizer, based upon the weight of the plasticizers.

Typical formulations including the blend of the present invention could be, in parts by weight:
a) Thermoplastic polymer (such as PVC or PVC copolymer) 100 phr (parts per hundreds of polymer);
b) First Plasticizer of indane and/or tetralin ester(s) (25-85 phr, alternately 30-70 phr, alternately 35-65 phr);
c) optional, Second Plasticizer(s) (5-55 phr, alternately 5-45 phr, alternately 10-35 phr);
d) Filler (0-150 phr, alternately 2-100 phr, alternately 3-80 phr); and
e) Stabilizer (1-10 phr, alternately 2-8 phr, alternately 4-6 phr).

Alternatively, typical formulations for use in the production of automotive underbody sealants which typically have high plasticizer and high filler could be, in parts by weight:
a) Thermoplastic polymer (such as PVC and/or PVC copolymer) 100 phr (preferably combinations of PVC and PVC copolymer);
b) First Plasticizer of indane and/or tetralin ester(s) (50-100 phr, alternately 60-90 phr, alternately 65-85 phr);
c) Second Plasticizer(s) (15-45 phr, alternately 20-40 phr, alternately 25-35 phr);
d) Filler, such as calcium carbonate, (60-200 phr alternately 70-150 phr, alternately 80-120 phr); and
e) Stabilizer and other additives (0-10 phr, alternately 2-8 phr, alternately 3-6 phr).

As a further embodiment formulations for the production of calendered floor tiles could be, in parts by weight:
a) Thermoplastic polymer (such as PVC and/or PVC copolymer) 100 phr (preferably combinations of PVC and PVC copolymer);
b) First Plasticizer of indane and/or tetralin ester(s) (20-60 phr, alternately 25-55 phr, alternately 35-45 phr);
c) Second Plasticizer(s) (5-50 phr, alternately 10-35 phr, alternately 15-30 phr);
d) Epoxidized soybean oil (0-6 phr, alternately 1-5 phr, alternately 2-4 phr);
e) Filler, such as $CaCO_3$, (200 to 800 phr, alternately 400-700 phr, alternately 500-600 phr); and
f) Pigments, stabilizers, other additives (0-10 phr).

As a further embodiment, formulations for the production of wire and cable (insulation, filling compound, sheathing, etc.) could be, in parts by weight:
a) Thermoplastic polymer (such as PVC and/or PVC copolymer) 100 phr (preferably combinations of S-PVC and PVC copolymer);
b) First Plasticizer of indane and/or tetralin ester(s) (35-95 phr, alternately 30-80 phr, alternately 40-70 phr);
c) Second Plasticizer(s) (5-35 phr, alternately 5-30 phr, alternately 10-25 phr);
d) Filler, such as $CaCO_3$, (60 to 600 phr, alternately 70-500 phr, alternately 80-150 phr); and
e) Stabilizers, other additives (0-20 phr, alternately 5-15 phr, alternately 5-10 phr).

The present invention, therefore, further provides the use of from 20 to 120 phr (parts per 100 parts of thermoplastic polymer, such as polyvinyl chloride), from 30 to 90, more preferably from 40 to 80, more preferably from 50 to 70 phr of a plasticizer composition comprising indane and/or tetralin ester(s) to improve the processability of a thermoplastic polymer (such as polyvinyl chloride) formulation, especially in cold temperature flexibility and plasticizer weight loss (volatility). In a further embodiment, the present invention provides a plasticized polyvinyl chloride composition for use in pelletizing, extrusion, injection molding or calendering.

In a further embodiment, this invention provides extruded or injection molded articles obtained from a plasticized thermoplastic polymer, such as polyvinyl chloride, composition containing from 20 to 100, preferably from 30 to 90, more preferably from 40 to 80, more preferably from 50 to 70 parts by weight of the plasticizer(s) of the present invention.

We have also found that the use of the plasticizers of the present invention are particularly useful in the transformation of the plasticized polyvinyl chloride composition including, for example, pelletizing, extrusion, injection molding and calendering. Calendering is used in applications such as the production of roofing, protective films including stationery. Extrusion is used in the production of films, pipes, guttering and wire and cable coatings. Injection molding is used in the production of shoes, toys and the like.

The polymer composition comprising a thermoplastic polymer and indane and/or tetralin ester(s) plasticizers described herein may further contain additives to optimize the chemical, mechanical or processing properties, said additives being more particularly selected from the group consisting of fillers, clays, nanoparticles, fibers, such as calcium carbonate, titanium dioxide or silica, carbon fibers, clays, pigments, thermal stabilizers, antioxidants, UV stabilizers, lubricating or slip agents, flame retardants, antistatic agents, biocides, impact modifiers, blowing agents, (polymeric) processing aids, viscosity depressants or regulators such as thickener and thinners, antifogging agents, optical brighteners, etc.

Thermal stabilizers useful herein include all customary polymer stabilizers, especially PVC stabilizers in solid or liquid form, examples are those based on Ca/Zn, Ba/Zn, Pb, Sn or on organic compounds (OBS), and also acid-binding phyllosilicates such as hydrotalcite. The mixtures to be used according to the present invention may have a thermal stabilizer content of 0.5 to 10, preferably 0.8 to 5 and more preferably 1.0 to 4 wt %, based upon the weight of the polymer composition.

It is likewise possible to use costabilizers with plasticizing effect in the polymer composition comprising a thermoplastic polymer and at least one plasticizer as described herein, in particular epoxidized vegetable oils, such as epoxidized linseed oil or epoxidized soya oil.

Antioxidants are also useful in the polymer composition comprising a thermoplastic polymer and at least two plasticizers (at least one first plasticizer and at least one second plasticizer) as described herein and can include sterically hindered amines—known as HALS stabilizers, sterically hindered phenols, such as Topanol™ CA, phosphites, UV absorbers, e.g., hydroxybenzophenones, hydroxyphenylbenzotriazoles and/or aromatic amines. Suitable antioxidants for use in the compositions of the present invention are also described for example in "Handbook of Vinyl Formulating" (editor: R. F. Grossman; J. Wiley & Sons; New Jersey (US) 2008). The level of antioxidants in the mixtures of the present invention is typically not more than 10 phr, preferably not more than 8 phr, more preferably not more than 6 phr and even more preferably between 0.01 and 5 phr (phr=parts per hundred parts of polymer). The antioxidant can also be mixed with the plasticizer for better dispersion and stabilizing efficiency. The level of antioxidants in the plasticizer blends of the present invention is typically not more than 0.5 wt % of the total plasticizer weight, more preferably not more than 0.3 wt %, more preferably between 0.1 and 0.3 wt %.

Organic and inorganic pigments can be also used in the polymer composition comprising a thermoplastic polymer and at least two plasticizers (at least one first plasticizer and at least one second plasticizer) as described herein. The level of pigments in the compositions to be used according to the present invention is typically not more than 10 phr, preferably in the range from 0.01 to 5 phr and more preferably in the range from 0.1 to 3 phr. Examples of useful inorganic pigments are $TiO_2$, CdS, $CoO/Al_2O_3$, $Cr_2O_3$. Examples of useful organic pigments are, for example, azo dyes, phthalocyanine pigments, dioxazine pigments and also aniline pigments.

The polymer composition comprising a thermoplastic polymer and plasticizer (at least one first plasticizer and an optional second plasticizer) as described herein may contain one or more filler, including mineral and/or synthetic and/or natural, organic and/or inorganic materials, for example, calcium oxide, magnesium oxide, calcium carbonate, barium sulphate, silicon dioxide, phyllosilicate, carbon black, bitumen, wood (e.g., pulverized, as pellets, micropellets, fibers, etc.), paper, natural and/or synthetic fibers, glass, etc.

The compositions described herein can be produced in various ways. In general, however, the composition is produced by intensively mixing all components in a suitable mixing container at elevated temperatures. The plastic pellet or powder (typically suspension PVC, microsuspension PVC or emulsion PVC) is typically mixed mechanically, i.e., for example in fluid mixers, turbomixers, trough mixers or belt screw mixers with the plasticizers and the other components at temperatures in the range from 60° C. to 140° C., preferably in the range from 80° C. to 110° C. The components may be added simultaneously or, preferably, in succession (see also E. J. Wickson "Handbook of PVC Formulating", John Wiley and Sons, 1993, pp. 747 ff). The blend of PVC, plasticizer and other additive as described above (e.g., the PVC compound or the PVC paste) is subsequently sent to the appropriate thermoplastic molding processes for producing the finished or semi-finished article, optionally a pelletizing step is interposed.

The blends (e.g., the PVC compound or the PVC paste) are particularly useful for production of garden hoses, pipes, and medical tubing, vinyl gloves, floor coverings, flooring tiles, films, sheeting, roofing, or roofing webs, pool liners, building protection foils, upholstery, and cable sheathing and wire insulation, particularly wire and cable coating, coated textiles and wall coverings. The blends (e.g., the PVC compound or the PVC paste) are particularly useful for production of tubing, wire insulation, cable insulation and blood bags.

The plasticizer combinations of the invention are useful across the range of plasticized polyvinyl chloride materials. The plasticizers of the invention are useful in the production of semi-rigid polyvinyl chloride compositions which typically contain from 10 to 40 phr, preferably 15 to 35 phr, more preferably 20 to 30 phr of plasticizers (phr=parts per hundred parts PVC); flexible polyvinyl chloride compositions which typically contain from 40 to 60 phr, preferably 44 to 56 phr, more preferably from 48 to 52 phr plasticizers; and highly flexible compositions which typically contain from 70 to 110 phr, preferably 80 to 100 phr, more preferably 90 to 100 phr of plasticizers.

One widespread use of polyvinyl chloride is as a plastisol. A plastisol is a fluid or a paste consisting of a mixture of polyvinyl chloride and a plasticizer optionally containing various additives, such as those described above. A plastisol is used to produce layers of polyvinyl chloride which are then fused to produce coherent articles of flexible polyvinyl chloride. Plastisols are useful in the production of flooring, tents, tarpaulins, coated fabrics such as automobile upholstery, in car underbody coatings, in moldings and other consumer products. Plastisols are also used in footwear, fabric coating, toys, flooring products and wallpaper. Plastisols typically contain 40 to 200 phr, more typically 50 to 150 phr, more typically 70 to 120 phr, more typically 90 to 110 phr of plasticizers.

In a preferred embodiment of the invention, the plasticizers (at least one first plasticizer of indane and or tetralin ester(s) and an optional second plasticizer) as described herein is combined with a polymer such as PVC to form a PVC compound (typically made from suspension PVC) or a PVC paste (typically made from an emulsion PVC). A particularly useful PVC in the PVC compound or paste is one having a K value of 65 or more, preferably from 65 to 95, preferably from 70 to 90, preferably from 70-85, alternately the PVC has a K value above 70 (K value is determined according to ISO 1628-2). Particularly preferred PVC compounds or pastes comprise: 20 to 200 phr, (alternately 20 to 100 phr) plasticizers and/or 0.5 to 15 phr stabilizer(s), and/or 1 to 100 phr (alternately 1 to 30 phr), preferably 15 to 90 phr (alternately 15 to 30 phr) filler(s), even more preferably the filler is calcium carbonate and the stabilizer is a calcium/zinc stabilizer. The above combination is useful in wire and cable coatings, particularly automobile wire and cable coating and/or building wire insulation.

In general, a particularly good (i.e., low) glass transition temperature is achievable for the polymer compositions of the present invention by using plasticizer which itself has a low glass transition temperature and/or by using a high plasticizer content. Polymer compositions of the present invention may have glass transition temperatures in the range from −70° C. to +10° C., preferably in the range from −60° C. to −5° C., more preferably in the range from −50° C. to −20° C. and most preferably in the range from −45° C. to −30° C.

Unless otherwise indicated, glass transitions (Tg) are midpoints of the second heats obtained by Differential Scanning calorimetry (DSC) using a TA Instruments Q100 calorimeter fitted with a cooling accessory. Typically, 6 to 10 mg of the sample are sealed in an aluminum pan and loaded into the instrument at room temperature. Melting data (first heat) is acquired by heating the sample to at least 30° C. above its melting temperature at a heating rate of 10° C./min. The sample is held for at least 5 minutes at this temperature to destroy its thermal history. Crystallization data are acquired by cooling the sample from the melt to at least 50° C. below the crystallization temperature, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified. For purposes of this invention and the claims thereto, Tg is determined by DSC, unless otherwise indicated.

This invention further relates to:
1. A polymer composition comprising: 1) a thermoplastic polymer, 2) a first plasticizer of indane and/or tetralin ester(s), preferably represented by the formula:

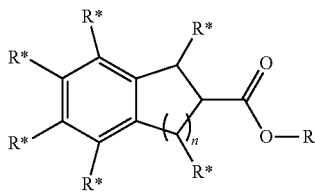

where n is 1 or 2, R is C1 to C20 linear, cyclic or branched alkyl, and each R* is, independently, H or C1 to C20 linear, cyclic or branched alkyl, where any adjacent R* can form ring structures (preferably represented by the formula:

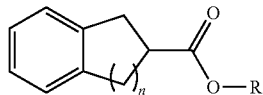

wherein n is 1 or 2, and R is $C_1$ to $C_{20}$ linear, cyclic or branched alkyl); and 3) an optional second plasticizer selected from the group consisting of: alkyl terephthalate, alkyl phthalate, alkyl benzoate ester, di-benzoate ester, ester of cyclohexane polycarboxylic acid, dialkyl adipate, compound(s) of the formula:

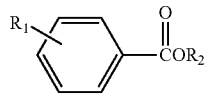

wherein $R_1$ is a saturated or unsaturated cyclic hydrocarbon optionally substituted with an alkyl and/or an OXO-ester, and $R_2$ is a $C_4$ to $C_{20}$ hydrocarbyl; or a mixture thereof (note the use of a subscript for $R_2$ is not meant to indicate 2R groups).
2. The polymer composition of paragraph 1, wherein the second plasticizer comprises at least two compounds from the group consisting of alkyl terephthalates, alkyl phthalates, alkyl benzoate esters, di-benzoate esters, esters of cyclohexane polycarboxylic acids, and dialkyl adipates.
3. The polymer composition of paragraph 1, wherein the second plasticizer comprises C4 to C12 alkyl terephthalates, C4 to C40 alkyl phthalates, C4 to C40 alkyl isophthalates, C7 to C13 alkyl benzoate esters, C4 to C13 dialkyl adipates, or combinations thereof.
4. The polymer composition of paragraph 1 wherein the second plasticizer comprises a compound of the formula:

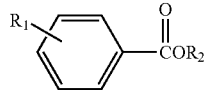

wherein $R_1$ is a saturated and unsaturated cyclic hydrocarbon optionally substituted with an alkyl and/or an OXO-ester, and $R_2$ is a $C_4$ to $C_{20}$ hydrocarbyl (note the use of a subscript for $R_2$ is not meant to indicate 2R groups).
5. The polymer composition of any of paragraphs 1 to 4, wherein the thermoplastic polymer is selected from the group consisting of vinyl chloride resins, polyesters, polyurethanes, ethylene-vinyl acetate copolymer, rubbers, poly (meth)acrylics and combinations thereof.
6. The polymer composition of any of paragraphs 1 to 4, wherein the thermoplastic polymer is polyvinyl chloride.
7. The polymer composition of any of paragraphs 1 to 6, wherein the thermoplastic polymer is present at 99 to 40 wt % and the plasticizers are present at 1 to 60 wt %.
8. The polymer composition of any of paragraphs 1 to 4, wherein the thermoplastic polymer is a PVC suspension, a PVC microsuspension, a PVC emulsion, or a combination thereof.
9. The polymer composition of any of paragraphs 1-9, further comprising: an additive selected from the group consisting of a filler, a pigment, a matting agent, a heat stabilizer, an antioxidant, a UV stabilizer, a flame retardant, a viscosity regulator, a solvent, a deaerating agent, an adhesion promoter, a process aid, and a lubricant.
10. The polymer composition of any of paragraphs 1 to 9, wherein the second plasticizer comprises one or more compounds represented by the formula:

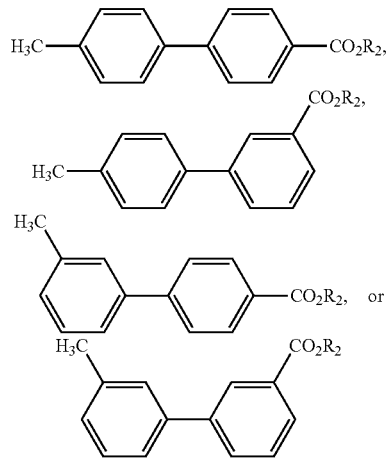

wherein $R_2$ preferably is $C_7H_{15}$, $C_9H_{19}$, $C_{10}H_{21}$, $C_{11}H_{23}$ or $C_{13}H_{27}$ (note the use of a subscript for $R_2$ is not meant to indicate 2R groups).
11. The polymer composition of any of paragraphs 1 to 10, wherein the first plasticizer of indane and/or tetralin ester(s) is 1H-Indene-2-carboxylic acid, 2,3-dihydro-isononyl ester; 1H-Indene-2-carboxylic acid, 2,3-dihydro-2-methyl-isononyl ester;
1H-Indene-1-carboxylic acid, 2,3-dihydro-1-methyl-isononyl ester;
1H-Indene-1-carboxylic acid, 2,3-dihydro-isononyl ester;
1-Naphthalenecarboxylic acid, 1,2,3,4-tetrahydro-1-methyl-isononyl ester;
1-Naphthalenecarboxylic acid, 1,2,3,4-tetrahydro-isononyl ester;
2-Naphthalenecarboxylic acid, 1,2,3,4-tetrahydro-2-methyl-isononyl ester;
2-Naphthalenecarboxylic acid, 1,2,3,4-tetrahydro-isononyl ester; an isomer thereof, and mixtures thereof.

12. The polymer composition of any of paragraphs 1 to 10, wherein the first plasticizer of indane and/or tetralin ester(s) is 1-H-Indene-2-carboxylic acid, 2,3-dihydro, n-pentyl ester or 1-H-Indene-2-carboxylic acid, 2,3-dihydro, n-decyl ester.

13. The polymer composition of any of paragraphs 1 to 12, further comprising: an additive selected from the group consisting of a filler, a pigment, a matting agent, a heat stabilizer, an antioxidant, a UV stabilizer, a flame retardant, a viscosity regulator, a solvent, a deaerating agent, an adhesion promoter, a process aid, and a lubricant.

14. A floor covering, wallpaper, tarpaulin, coated textile, or wall covering comprising the composition of any of paragraphs 1 to 14.

15. A film comprising the composition of any of paragraphs 1 to 14 wherein the film is a roofing sheet, a tarpaulin, a banner, synthetic leather, packaging film, a medical article, a toy, a seal, or an automobile interior article.

16. Tubing, wire insulation, or cable insulation comprising the composition of any of paragraphs 1 to 14.

EXAMPLES

Unless otherwise indicated, room temperature is about 21° C.

Example 1

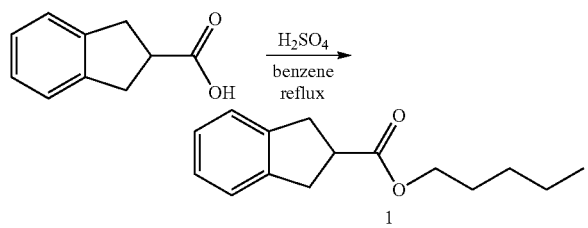

Synthesis of pentyl-2,3-dihydro-1H-indene-2-carboxylate (1)

In a 250 mL round bottom flask, 2,3-dihydro-1H-indene-2-carboxylic acid (14.063 g, 86.7 mmol) and n-pentanol (8.421 g, 95.5 mmol) were dissolved in 100 mL of benzene and a catalytic amount of sulfuric acid was added. The flask was fitted with dean stark trap and condenser and heated to reflux for 18 hours. Reaction was then cooled and filtered through alumina resulting in a clear/colorless solution. Solvent removed yielding 18.3 g (91%) of 1.

Example 2

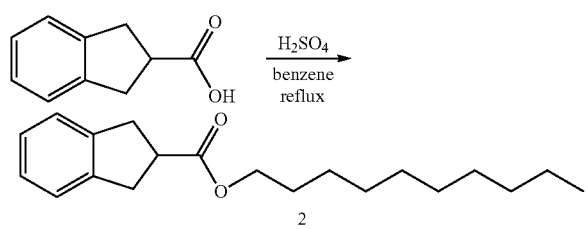

Synthesis of decyl-2,3-dihydro-1H-indene-2-carboxylate (2)

In a 250 mL round bottom flask, 2,3-dihydro-1H-indene-2-carboxylic acid (11.18 g, 68.9 mmol) and n-decanol (12.91 g, 81.5 mmol) were dissolved in 100 mL of benzene and a catalytic amount of sulfuric acid was added. The flask was fitted with dean stark trap and condenser and heated to reflux for 18 hours. Reaction was then cooled and filtered through alumina resulting in a clear/colorless solution. Solvent removed yielding 18.29 g (88%) of 2.

Method for Preparation of Plasticized Polymer Testing Bars by Melt Mixing Method B In a 250 ml beaker was added 2.7 g of an additive package containing a 70/30 wt/wt of Paraplex G62 ESO/Mark 4716. (Paraplex™ G62 ESO is an epoxidized soybean oil available from The HallStar Company, Chicago, Ill./Mark™ 4716 is a barium-zinc stabilizer available from Galata Chemicals, Southbury, Conn.). To this was added 19.1 g of plasticizer and the mixture was stirred with a spatula until blended. After blending, 38.2 g of PVC (Oxy Vinyls™ PVC homopolymer resin) was added and the mixture was mixed forming a paste. The mixture was added to the melt mixture. A Haake Rheomix 600 mixer manufactured by Haake PolyLab System was preheated to the desired mixing temperature (165° C. for most experiments). A coarsely mixed sample consisting of plasticizer, polyvinylchloride and stabilizers was added to the mixer while stirring at 35 rpm. After addition the mixer was stopped for one minute. The mixer was started again and the sample was mixed for five minutes. After mixing for five minutes the mixer was stopped and disassembled. The mixed sample was removed hot.

Bars were made using a Carver press according to the following procedure: The press was preheated with the mold at 170° C. The mold was removed hot and the plasticized PVC was placed on the mold. The mold was put back into the press and remained there for 3 minutes without pressure. Then 10 tons of pressure was placed on the mold and remained for 1 minute, the pressure was increased to 15 tons and remained there for another minute. Finally, the pressure was increased to 30 tons and remained at that pressure for 3 minutes. The pressure was released after 3 minutes, then the mold was placed in the cold side of the press and 30 tons of pressure was added for another 3 minutes. Most of the analytical testing was done one week after pressing.

98° C. Weight Loss Comparison of PVC Bars Plasticized with Esters Versus PVC Bars Plasticized with Commercial Plasticizer Two each of the PVC sample bars prepared above were placed separately in aluminum weighing pans and placed inside a convection oven at 98° C. Initial weight measurements of the bars and measurements taken at one day and seven day time intervals were recorded, and an average value calculated. The averaged results are shown in Table 1.

TABLE 1

| Weight Loss Data | | |
|---|---|---|
| Plasticizer | One Day Weight Loss (%) | Seven Day Weight Loss (%) |
| Diisononylphthalate (DINP) | 0.553 | 0.707 |
| Example 1 | 9.93 | 12.0 |
| Example 2 | 2.97 | 5.31 |

70° C. Humid Aging Clarity Comparison of PVC Bars Plasticized with Esters Versus PVC Bars Plasticized with Commercial Plasticizer Using a standard one-hole office paper hole punch, holes were punched in two each of the sample bars prepared above 1/8" from one end of the bar. The bars were hung in a glass pint jar (2 bars per jar) fitted with a copper insert providing a stand and hook. The jar was filled with approx. 1/2" of distilled water and the copper insert was adjusted so that the bottom of each bar was approx. 1" above the water level. The jar was sealed, placed in a 70° C. convection oven, and further sealed by winding Teflon™ tape around the edge of the lid. After 21 days the jars were removed from the oven, allowed to cool for approx. 20 minutes, opened, and the removed bars were allowed to sit under ambient conditions in aluminum pans (with the bars propped at an angle to allow air flow on both faces) or hanging from the copper inserts for 14 days (until reversible humidity-induced opacity had disappeared). The bars were evaluated visually for clarity. All bars exhibited complete opacity during the duration of the test and for several days after removal from the oven. Notes on 70° C. Humid Aging Clarity and appearance properties of ester- and DINP-containing PVC bars are shown in Table 2.

TABLE 2

| | Humidity Tests |
|---|---|
| Sample | Notes |
| DINP | Some cloudiness |
| Example 1 | Clear, no cloudiness or exudation |
| Example 2 | Clear, no cloudiness or exudation |

Differential Scanning Calorimetry (DSC) and Thermogravimetric Analysis (TGA) Property Study of Esters and Plasticized Bars Thermogravimetric Analysis (TGA) was conducted on the neat esters using a TA Instruments TGA5000 instrument (25-450° C., 10° C./min, under 25 cc $N_2$/min flow through furnace and 10 cc $N_2$/min flow through balance; sample size approximately 10 mg). Table 3 provides a volatility comparison of the plasticized PVC bars obtained using TGA.

TABLE 3

| Weight Loss of Plasticized Bars @220° C. by TGA | |
|---|---|
| Sample | Weight loss @220° C. by TGA (%) |
| DINP | 2.32 |
| NGP149 | 19.0 |
| NGP150 | 9.00 |

Demonstration of Plasticization of PVC with Different Esters Made Using this Disclosure Via Differential Scanning Calorimetry (DSC)

Differential Scanning calorimetry (DSC) was performed on the compression-molded sample bars prepared above (PVC:plasticizer ratio=2:1) using a TA Instruments Q2000 calorimeter equipped with a liquid $N_2$ cooling accessory. Samples were loaded at room temperature and cooled to at least −110° C. at 10° C./min, and then analyzed on heating at a rate of 10° C./min to 130-160° C. for plasticized PVC bars, and to 100° C. for the comparative neat PVC bar. Small portions of the sample bars (typical sample mass 5-7 mg) were cut for analysis, making only vertical cuts perpendicular to the largest surface of the bar to preserve the upper and lower compression molding "skins". The pieces were then placed in the DSC pans so that the upper and lower "skin" surfaces contacted the bottom and top of the pan. Table 4 provides the first heat Tg onset, midpoint, and end for neat PVC and the plasticized bars. A lowering and broadening of the glass transition for neat PVC was observed upon addition of the esters, indicating plasticization and extension of the flexible temperature range of use for neat PVC.

TABLE 4

| Plasticizer Used in Bar | $T_g$ Onset (° C.) | $T_g$ Midpt (° C.) | $T_g$ End (° C.) |
|---|---|---|---|
| None (Neat PVC) | 82.6 | 84.5 | 85.6 |
| NGP150 | −69.2 | −40.8 | −14.0 |
| NGP149 | −47.0 | −29.7 | −12.4 |

Demonstration of Plasticization of PVC with Different Esters Via Dynamic Mechanical Thermal Analysis (DMTA)

A TA Instruments DMA Q800 fitted with a liquid $N_2$ cooling accessory and a three-point bend clamp assembly was used to measure the thermo-mechanical performance of neat PVC and the PVC/plasticizer blend sample bars prepared above. Samples were loaded at room temperature and cooled to −90° C. at a cooling rate of 3° C./min. After equilibration, a dynamic experiment was performed at a constant frequency of 1 Hz using the following conditions: 3° C./min heating rate, 20 μm amplitude, 0.01 N pre-load force, force track 120%. Two or three bars of each sample were typically analyzed and numerical data was averaged. The DMTA measurement gives storage modulus (elastic response modulus) and loss modulus (viscous response modulus); the ratio of loss to storage moduli at a given temperature is tan δ (tan delta). The tan δ peak is associated with the glass transition (temperature of the brittle-ductile transition) and is more easily interpreted for plasticized systems compared with the DSC curves. The beginning (onset) of the glass transition, Tg, was obtained from the tan δ curve for each sample by extrapolating a tangent from the steep inflection of the curve and the first deviation of linearity from the baseline prior to the beginning of the peak. Table 5 provides a number of DMTA parameters for neat PVC and PVC bars plasticized with materials described above: Tg onset (taken from tan δ); peak of the tan δ curve; storage modulus at 25° C.; and the temperature at which the storage modulus equals 100 MPa (this temperature was chosen to provide an arbitrary measure of the temperature at which the PVC loses a set amount of rigidity; too much loss of rigidity may lead to processing complications for the PVC material.). The storage modulus at 25° C. provides an indication of plasticizer efficiency (i.e., the amount of plasticizer required to achieve a specific stiffness); the higher the storage modulus, the more plasticizer required. The flexible use temperature range of the plasticized PVC samples is evaluated as the range between the Tg onset and the temperature at which the storage modulus was 100 MPa. A lowering and broadening of the glass transition for PVC is observed upon addition of the esters, indicating plasticization and extension of the flexible temperature range of use for PVC. Plasticization (enhanced flexibility) is also demonstrated by lowering of the PVC room temperature storage modulus upon addition of the esters.

TABLE 5

| Plasticizer Used in Bar | Tan δ $T_g$ Onset (° C.) | Tan δ Peak (° C.) | 25° C. Storage Mod. (MPa) | Temp. of 100 MPa Storage Mod. (° C.) | Flexible Use Range (° C.)[a] |
|---|---|---|---|---|---|
| Example 2 | −48.0 ± 2.3 | 2.57 ± 0.45 | 25.9 ± 13.9 | 8.0 ± 1.73 | 56 |
| Example 1 | −40.0 ± 0.6 | −3.67 ± 1.43 | 7.4 ± 1.6 | 5.29 ± 0.03 | 45.3 |

All patents and patent applications (including priority documents), test procedures, and other documents cited herein are fully incorporated by reference to the extent such disclosure is not inconsistent with this disclosure and for all jurisdictions in which such incorporation is permitted. Also, when numerical lower limits and numerical upper limits are listed herein, ranges from any lower limit to any upper limit are contemplated.

The disclosure has been described above with reference to numerous embodiments and specific examples. Many variations will suggest themselves to those skilled in this art in light of the above detailed description. All such obvious variations are within the full intended scope of the appended claims.

What is claimed is:

1. A composition comprising a thermoplastic polymer and a first plasticizer of the formula:

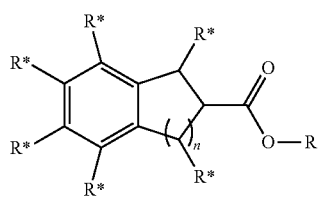

where n is 1 or 2, R is C1 to C20 linear, cyclic or branched alkyl, and each R* is, independently, H or C1 to C20 linear, cyclic or branched alkyl, where any adjacent R* can form ring structures.

2. The composition of claim 1, wherein the first plasticizer is represented by the formula:

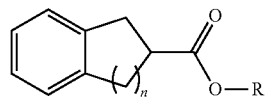

wherein n is 1 or 2, and R is $C_1$ to $C_{20}$ linear, cyclic or branched alkyl.

3. The composition of claim 1, wherein R is $C_1$ to $C_{14}$ alkyl.

4. The composition of claim 1, wherein $R_1$ is $C_1$ to $C_{14}$ alkyl, and n is 2.

5. The composition of claim 1, wherein $R_1$ is $C_1$ to $C_{14}$ alkyl, and n is 1.

6. The composition of claim 1, where the first plasticizer is one or more of:
1H-Indene-2-carboxylic acid, 2,3-dihydro-isononyl ester;
1H-Indene-2-carboxylic acid, 2,3-dihydro-2-methyl-isononyl ester;
1H-Indene-1-carboxylic acid, 2,3-dihydro-1-methyl-isononyl ester;
1H-Indene-1-carboxylic acid, 2,3-dihydro-isononyl ester;
1-Naphthalenecarboxylic acid, 1,2,3,4-tetrahydro-1-methyl-isononyl ester;
1-Naphthalenecarboxylic acid, 1,2,3,4-tetrahydro-isononyl ester;
2-Naphthalenecarboxylic acid, 1,2,3,4-tetrahydro-2-methyl-isononyl ester;
2-Naphthalenecarboxylic acid, 1,2,3,4-tetrahydro-isononyl ester;
1-H-Indene-2-carboxylic acid, 2,3-dihydro, n-pentyl ester;
1-H-Indene-2-carboxylic acid, 2,3-dihydro, n-decyl ester;
an isomer thereof, or mixtures thereof.

7. The composition of claim 1, further comprising a second plasticizer selected from the group consisting of: alkyl terephthalate, alkyl phthalate, alkyl benzoate ester, di-benzoate ester, ester of cyclohexane polycarboxylic acid, dialkyl adipate, compound(s) of the formula:

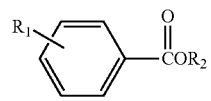

wherein $R_1$ is a saturated or unsaturated cyclic hydrocarbon optionally substituted with an alkyl and/or an OXO-ester, and $R_2$ is a $C_4$ to $C_{20}$ hydrocarbyl; or a mixture thereof.

8. The composition of claim 7, wherein the second plasticizer comprises at least two compounds from the group consisting of alkyl terephthalates, alkyl phthalates, alkyl benzoate esters, di-benzoate esters, esters of cyclohexane polycarboxylic acids, and dialkyl adipates.

9. The composition of claim 7, wherein the second plasticizer comprises C4 to C12 alkyl terephthalates, C4 to C40 alkyl phthalates, C4 to C40 alkyl isophthalates, C7 to C13 alkyl benzoate esters, C4 to C13 dialkyl adipates, or combinations thereof.

10. The composition of claim 1, wherein the second plasticizer comprises a compound of the formula:

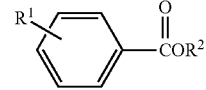

wherein $R^1$ is a saturated or unsaturated cyclic hydrocarbon optionally substituted with an alkyl and/or an OXO-ester, and $R^2$ is a $C_4$ to $C_{20}$ hydrocarbyl.

11. The composition of claim 1, wherein the thermoplastic polymer is selected from the group consisting of vinyl chloride resins, polyesters, polyurethanes, ethylene-vinyl acetate copolymer, rubbers, poly(meth)acrylics and combinations thereof.

12. The composition of claim 1, wherein the thermoplastic polymer is polyvinyl chloride.

13. The composition claim 1, wherein the thermoplastic polymer is present at 99 to 40 wt % and the plasticizers are present at 1 to 60 wt %.

14. The composition of claim 1, wherein the thermoplastic polymer is a PVC suspension, a PVC microsuspension, a PVC emulsion, or a combination thereof.

15. The composition of claim 1, further comprising: an additive selected from the group consisting of a filler, a pigment, a matting agent, a heat stabilizer, an antioxidant, a UV stabilizer, a flame retardant, a viscosity regulator, a solvent, a deaerating agent, an adhesion promoter, a process aid, and a lubricant.

16. A floor covering, wallpaper, tarpaulin, coated textile, or wall covering comprising the composition of claim 1.

17. A film comprising the composition of claim 1, wherein the film is a roofing sheet, a tarpaulin, a banner, synthetic leather, packaging film, a medical article, a toy, a seal, or an automobile interior article.

18. Tubing, wire insulation, or cable insulation comprising the composition of claim 1.

* * * * *